(12) United States Patent
Uygun (10) Patent No.: US 11,760,245 B2
(45) Date of Patent: Sep. 19, 2023

(54) FOLDABLE ATTENDANT STEP

(71) Applicant: Safran Seats USA LLC, Gainesville, TX (US)

(72) Inventor: Baris Uygun, Southlake, TX (US)

(73) Assignee: Safran Seats USA LLC, Gainesville, TX (US)

( * ) Notice: Subject to any disclaimer, the term of this patent is extended or adjusted under 35 U.S.C. 154(b) by 235 days.

(21) Appl. No.: 17/462,782

(22) Filed: Aug. 31, 2021

(65) Prior Publication Data
US 2023/0066591 A1    Mar. 2, 2023

(51) Int. Cl.
*B60N 2/75*    (2018.01)
*B64D 11/06*    (2006.01)

(52) U.S. Cl.
CPC ............ *B60N 2/79* (2018.02); *B64D 11/0646* (2014.12)

(58) Field of Classification Search
CPC .. B61D 33/005; B61D 33/0007; A47C 7/402; A47C 1/0303; B60N 2/75; B60N 2/763; B60N 2/79; B64D 11/0646; B64D 11/0691; B64D 11/0648
USPC .................................................... 297/411.36
See application file for complete search history.

(56) References Cited

U.S. PATENT DOCUMENTS

| | | | |
|---|---|---|---|
| 2,093,455 A * | 9/1937 | Knight | B61D 33/005 297/423.15 |
| 4,799,632 A * | 1/1989 | Baymak | B64D 11/0691 297/14 |
| 8,905,354 B2 * | 12/2014 | Griffiths | B64C 1/24 182/89 |
| 9,950,796 B2 | 4/2018 | Guttropf et al. | |
| 10,814,986 B2 | 10/2020 | Stachel et al. | |
| 11,407,514 B2 * | 8/2022 | Puglisi | B64D 11/0644 |
| 2014/0110193 A1 * | 4/2014 | Conley | B60R 3/02 182/91 |
| 2014/0326829 A1 | 11/2014 | Ehlers et al. | |
| 2020/0172225 A1 | 6/2020 | Johnson | |

FOREIGN PATENT DOCUMENTS

| | | |
|---|---|---|
| DE | 202012003042 U1 | 6/2013 |
| EP | 3782909 A1 | 2/2021 |
| EP | 4140887 A1 | 3/2023 |

OTHER PUBLICATIONS

Europe Patent Application No. 22189200.3, Communication pursuant to Rule 69 EPC, dated Mar. 6, 2023.
Europe Patent Application No. 22189200.3, Search Report, dated Jan. 5, 2023.

* cited by examiner

*Primary Examiner* — Richard Green
*Assistant Examiner* — Madison Elizabeth Dittner
(74) *Attorney, Agent, or Firm* — Kilpatrick Townsend & Stockton LLP (57) ABSTRACT

An armrest assembly for a passenger seat may include an armrest and an attendant step assembly. The armrest may include a top side and a bottom side, and the attendant step assembly may be connected to the bottom of the armrest. The attendant step assembly is movable between a stowed position and a deployed position relative to the bottom side of the armrest.

17 Claims, 13 Drawing Sheets

FOLDABLE ATTENDANT STEP

FIELD OF THE INVENTION

The field of the invention relates to passenger seats for passenger vehicles, and, more particularly, to armrest assemblies for passenger seats including but not limited to aircraft passenger seats.

BACKGROUND

Passenger vehicles, such as aircraft, buses, trains, ships, and automobiles, include passenger seats for passengers to sit in and utilize during travel. Sometimes, it may be preferable or necessary to reach some area above the passenger seat. For example, aircraft, buses, trains, and other vehicles sometimes include overhead stowage compartments that a passenger may use to stow his or her luggage during travel. Most passenger seats do not include any mechanism to facilitate reaching such areas. Moreover, in the limited circumstances where a passenger seat might include a step, such steps are fixed, thereby reducing the functionality of other components and taking up valuable space within the passenger vehicle.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an armrest assembly for a passenger seat includes an armrest and an attendant step. The armrest may include a top side and a bottom side. The attendant step may be connected to the bottom side of the armrest. The attendant step may include a step that is movable between a stowed position and a deployed position relative to the bottom side of the armrest In some embodiments, the attendant step assembly may include a first support leg and a second support leg. The first support leg and the second support leg may each be connected to the step and pivotably connected to the bottom side of the armrest. The step may be movable between the stowed position and the deployed position.

In various embodiments, the first support leg and the second support leg may each be pivotable and slidable relative to the step.

In certain embodiments, in the stowed position, the first support leg may extend at a 10° angle relative to the bottom side of the armrest, and, in the deployed position, the first support leg may extend at a 60° angle relative to the bottom side of the armrest.

In some embodiments, both in the stowed position and in the deployed position, the step may be vertically below the bottom side of the armrest.

In certain embodiments, in the stowed position, the step may be a first distance below the bottom side of the armrest, and, in the deployed position, the step may be a second distance below the bottom side of the armrest that is greater than the first distance.

In various embodiments, the armrest assembly may be vertically movable between a lowered position and a raised position, and, in the lowered position, the step may be in the stowed position.

In certain embodiments, the attendant step assembly may include at least one support connecting the step to the bottom side of the armrest. The at least one support may include a first end and a second end opposite from the first end. The first end may be pivotably connected to the bottom side of the armrest.

In some embodiments, the second end is at least one of pivotable relative to the step or slidable relative to the step.

In various embodiments, the step may define at least one guide channel. The second end of the at least one support may be at least partially received within the at least one guide channel and may be linearly movable along the at least one guide channel.

In some embodiments, the at least one guide channel may be elongated and may include a first end and a second end opposite from the first end. The first end may include a first stabilizing pocket, and the second end may include a second stabilizing pocket.

In some embodiments, in the stowed position, the second end of the at least one support may engage the second stabilizing pocket of the at least one guide channel, and, in the deployed position, the second end of the at least one support may engage the first stabilizing pocket of the at least one guide channel.

In some embodiments, the first end of the support may include a stopper slot. The armrest assembly may include a stopper pin retained within the stopper slot, and the stopper pin may be fixed relative to the at least one support.

In certain embodiments, the stopper pin may engage a first end of the stopper slot when the step is in the stowed position and may engage a second end of the stopper slot when the step is in the deployed position.

In some embodiments, the step may be biased towards the deployed position.

According to certain embodiments of the present invention, an attendant step assembly for a passenger seat may include a first support, a second support, and a step. The first support may include a first end and a second end. The second support may include a first end and a second end. The step may include a first guide channel within the step, a second guide channel within the step, and a step surface. The second end of the first support may be at least partially received within the first guide channel such that the second end of the first support may be pivotable and linearly movable relative to the step. The second end of the second support may be at least partially received within the second guide channel such that the second end of the second support may be pivotable and linearly movable relative to the step. The first end of the first support and the first end of the second support may each be connectable with an armrest of the passenger seat.

In certain embodiments, the step may be movable between a stowed position and a deployed position. In the stowed position, the second end of the first support may engage an inner end of the first guide channel, and the first support may extend at a first angle relative to the step surface. In the deployed position, the second end of the first support may engage an outer end of the first guide channel and the first support may extend at a second angle relative to the step surface that may be greater than the first angle.

According to certain embodiments of the present invention, an attendant step assembly for a passenger seat may include a support and a step. The support may include a first end and a second end. The first end may be connectable to an armrest of the passenger seat. The step may include a step surface, wherein the step may be movably connected to the second end of the support such that the second end of the support may be rotatable and slidable relative to the step surface.

In some embodiments, the step may include a guide channel within the step and between the step surface and a bottom surface opposite from the step surface. The second end of the support may be engaged with the step via the guide channel.

In certain embodiments, the armrest assembly may include the armrest and the attendant step assembly.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide step assemblies for passenger seats. While the step assemblies are discussed for use with aircraft seats, they are by no means so limited. Rather, embodiments of the step assemblies may be used in passenger seats or other seats of any type or otherwise as desired. Moreover, while the step assemblies are discussed for use with armrest assemblies of passenger seats, in other embodiments, the step assemblies may be provided with other structures as desired, such as an end bay cap, a seat console, a structure associated with a handicap seating area, combinations thereof, or other structures as desired.

Figure 1:
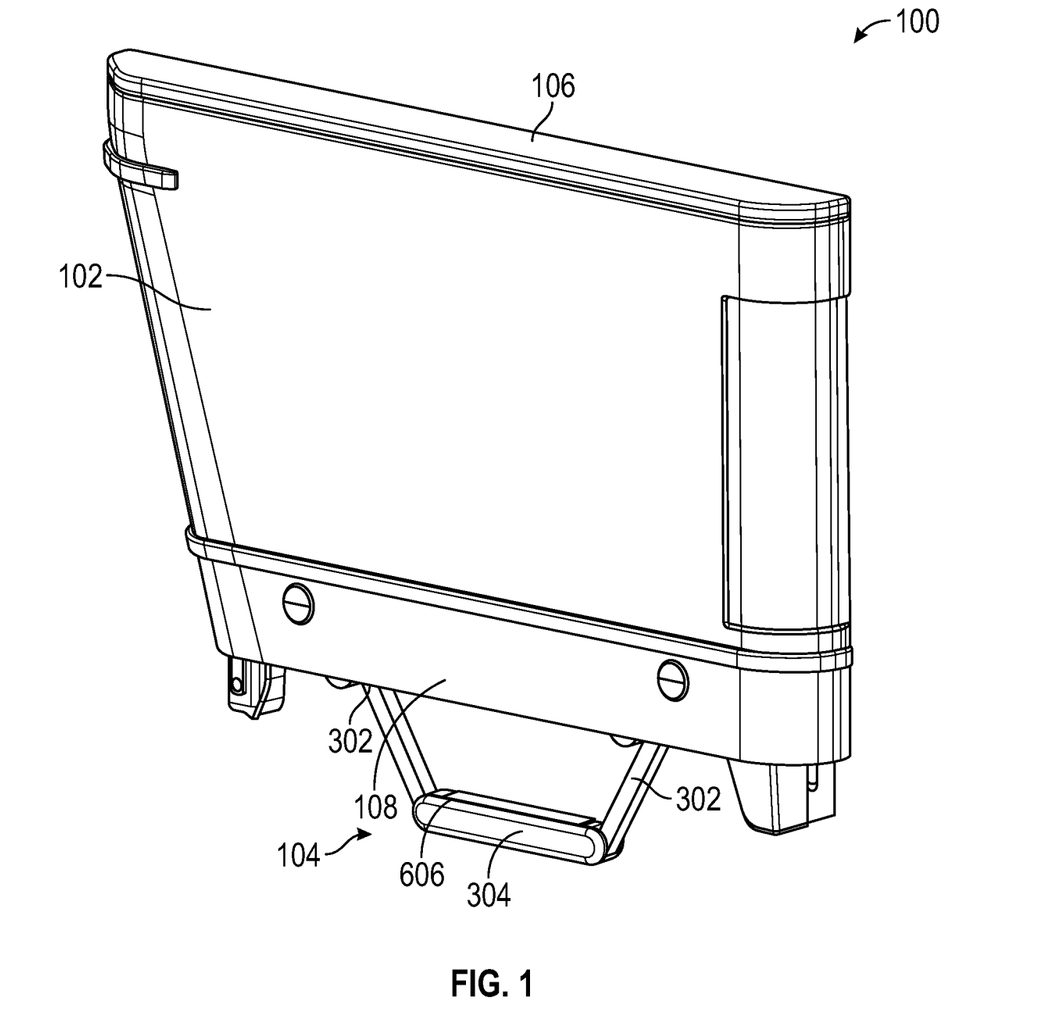
FIG. 1 is a perspective view of an armrest, according to certain embodiments of the present invention.
Figure 2:
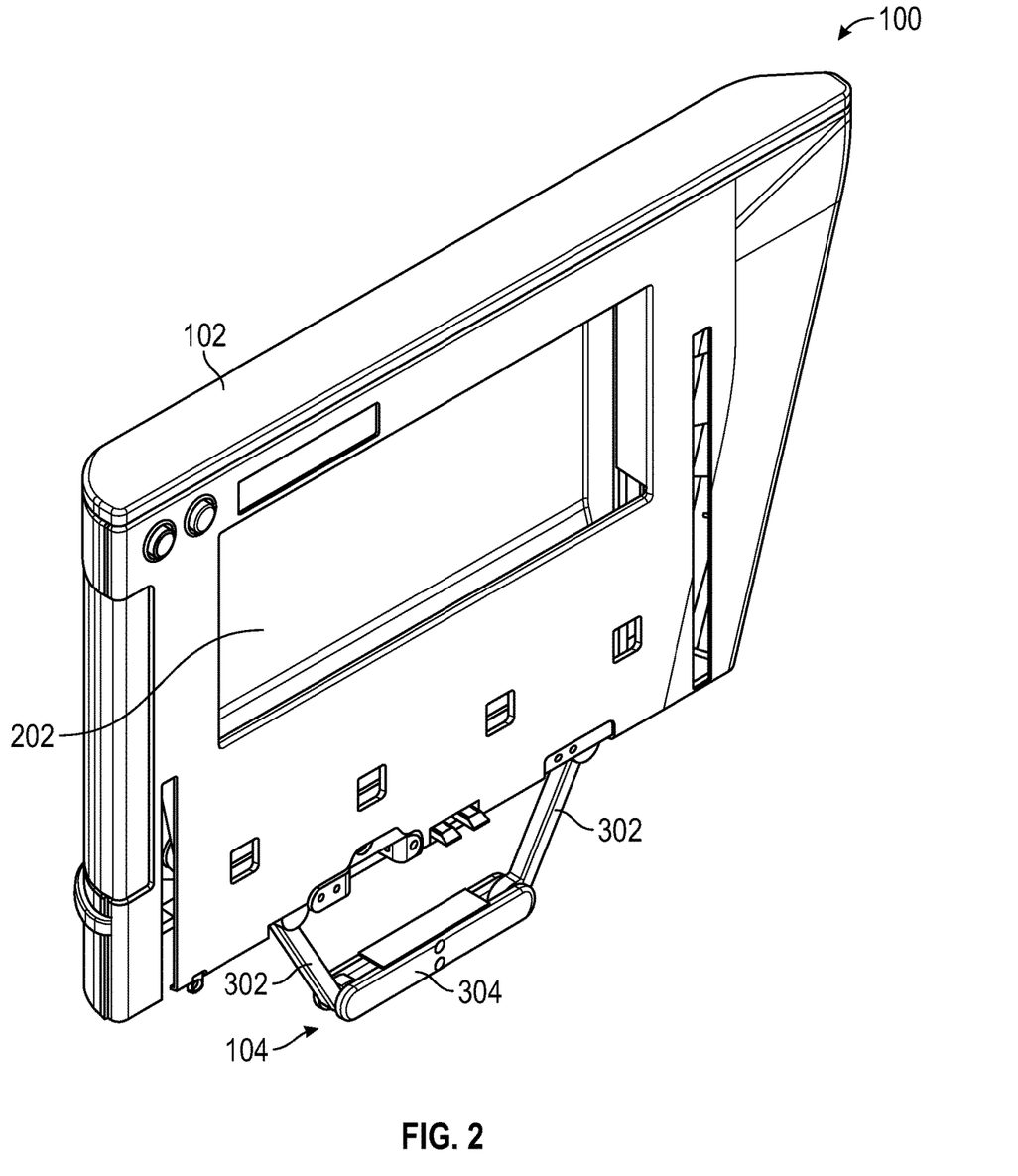
FIG. 2 is another perspective view of the armrest assembly of FIG. 1.

FIG. 1 is a perspective view of an armrest assembly 100 according to certain embodiments of the present invention. As shown in FIGS. 1 and 2, may include an armrest 102 and an attendant step assembly 104. In some embodiments, the armrest assembly 100 may be an armrest assembly for a handicap passenger seat area on an aircraft, although it need not be in other embodiments. The particular armrest 102 illustrated should not be considered limiting on the disclosure. Moreover, while the attendant step assembly 104 is illustrated on the armrest assembly 100, in other embodiments, the attendant step assembly 104 may be provided on other structures and/or other locations associated with a passenger seat as desired. Optionally, the attendant step assembly 104 may be provided with various structures that are movable between a stowed position and a deployed position.

The armrest 102 includes a top side 106 and a bottom side 108. Optionally, and as illustrated in FIG. 2, the armrest 102 may include a pocket 202 that is provided between the top side 106 and the bottom side 108. In certain embodiments, the pocket 202 may be used by the passenger. The armrest 102 may be formed of materials including but not limited to aluminum, stainless steel, aramid fibers, polycarbonate, polypropylene, other metallic materials, composite materials, or other similar materials. In other embodiments, the armrest 102 may include various other combinations or sub-combinations of components that may provide support for a passenger and/or may otherwise be used by the passenger.

Figure 9A:
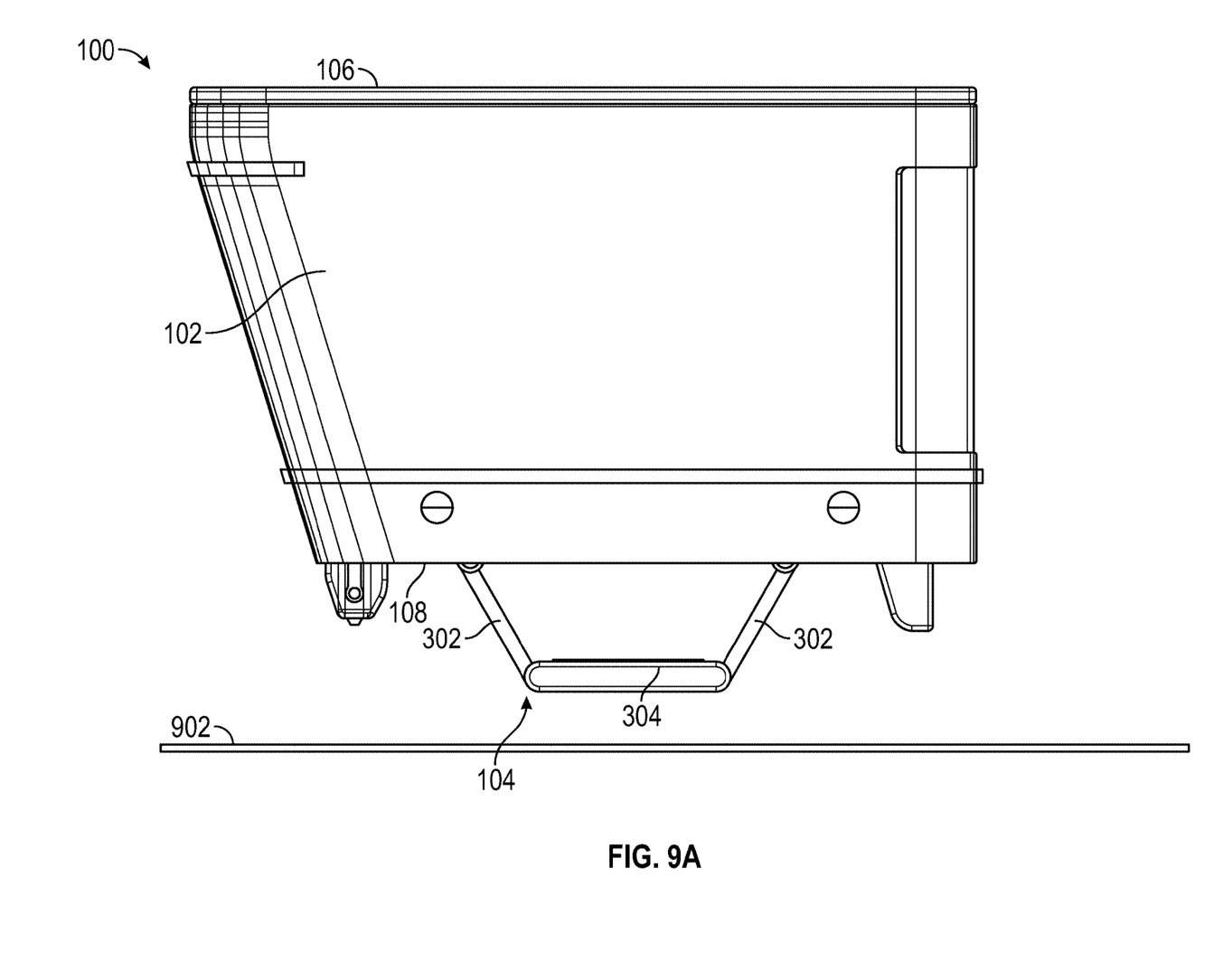
FIG. 9A is a perspective view of the armrest assembly of FIG. 1 in a deployed position.
Figure 9B:
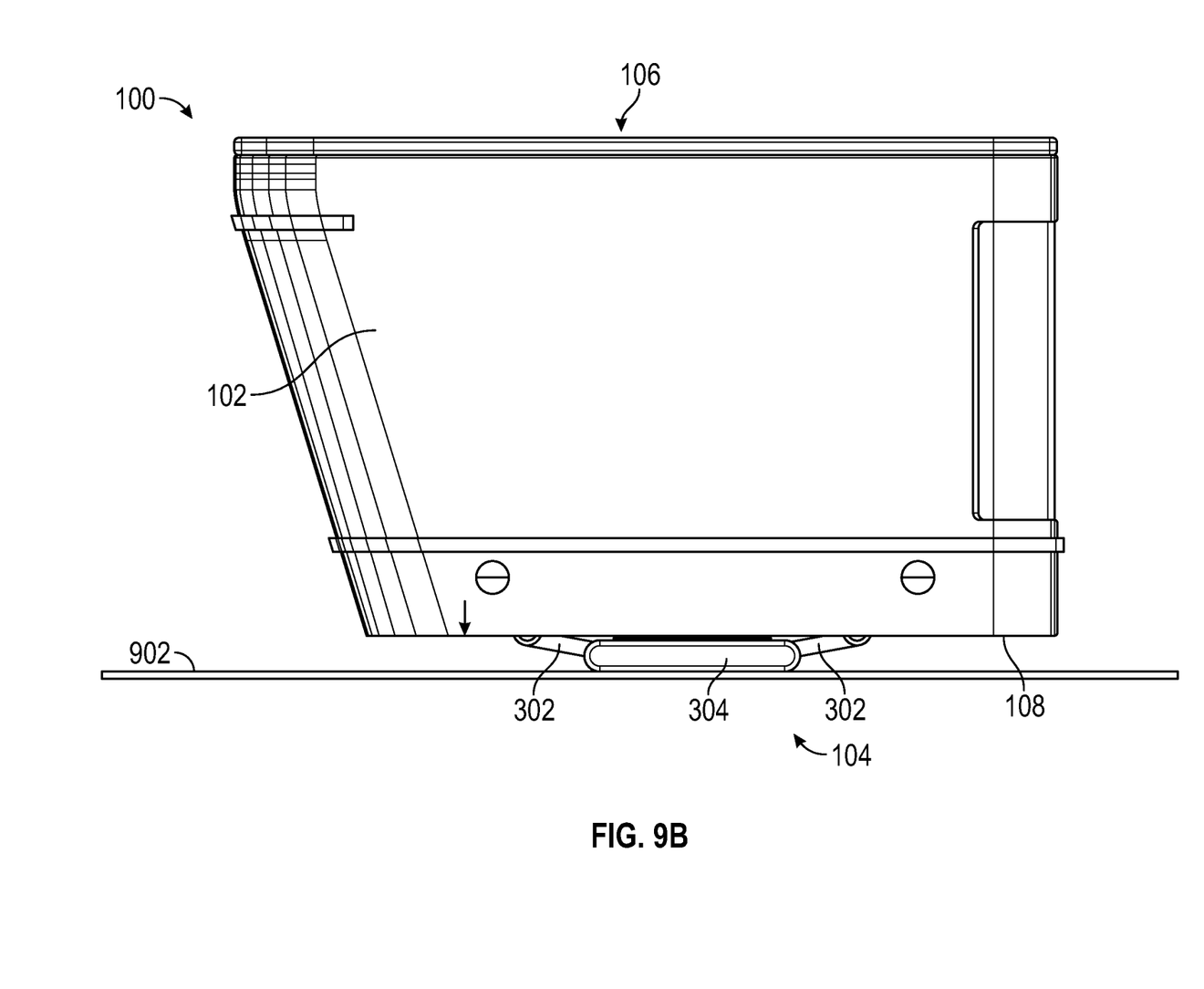
FIG. 9B is a perspective view of the armrest assembly of FIG. 1 in a stowed position.
Figure 10:
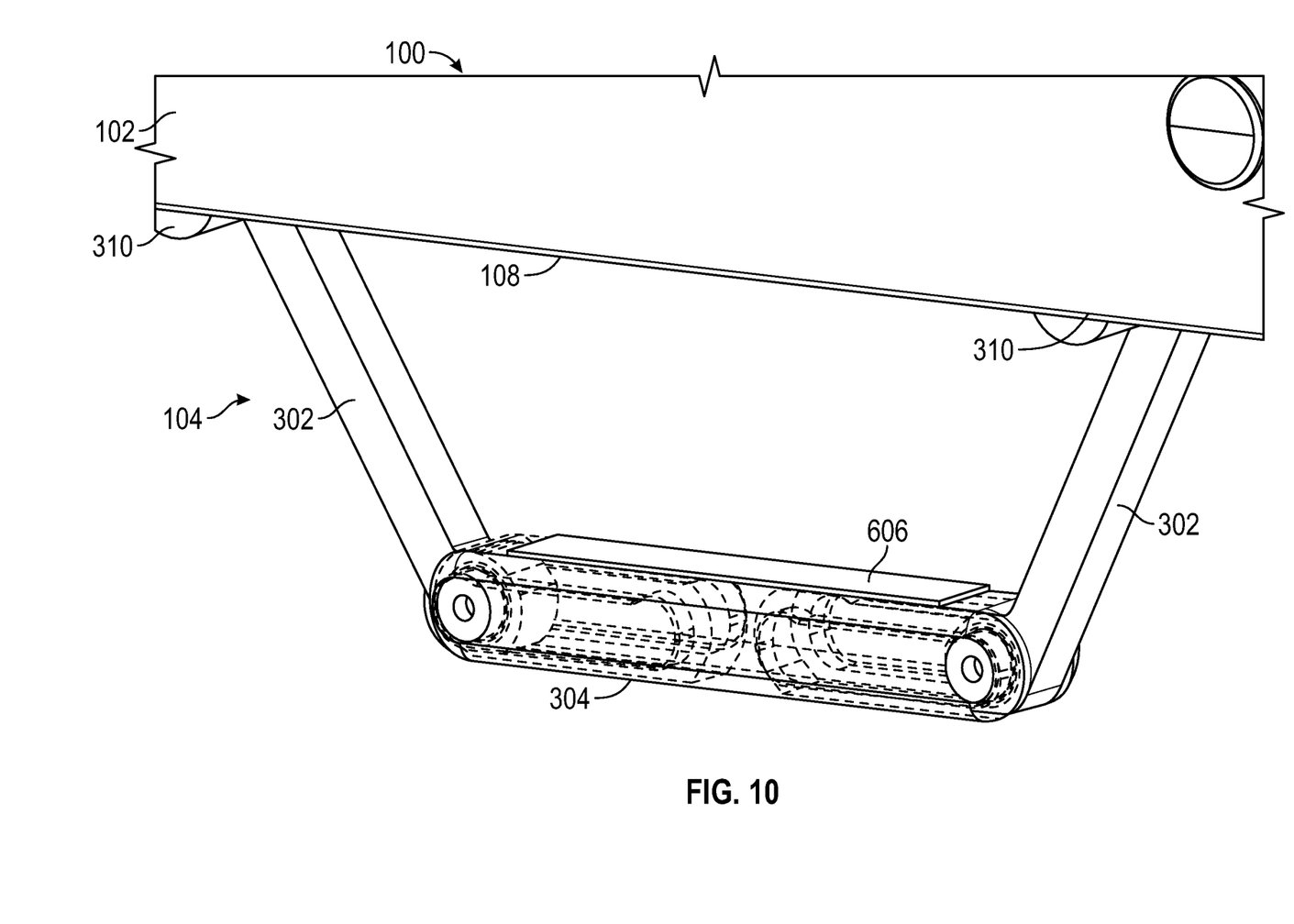
FIG. 10 is a perspective view of the attendant step assembly of FIG. 3.
Figure 11:
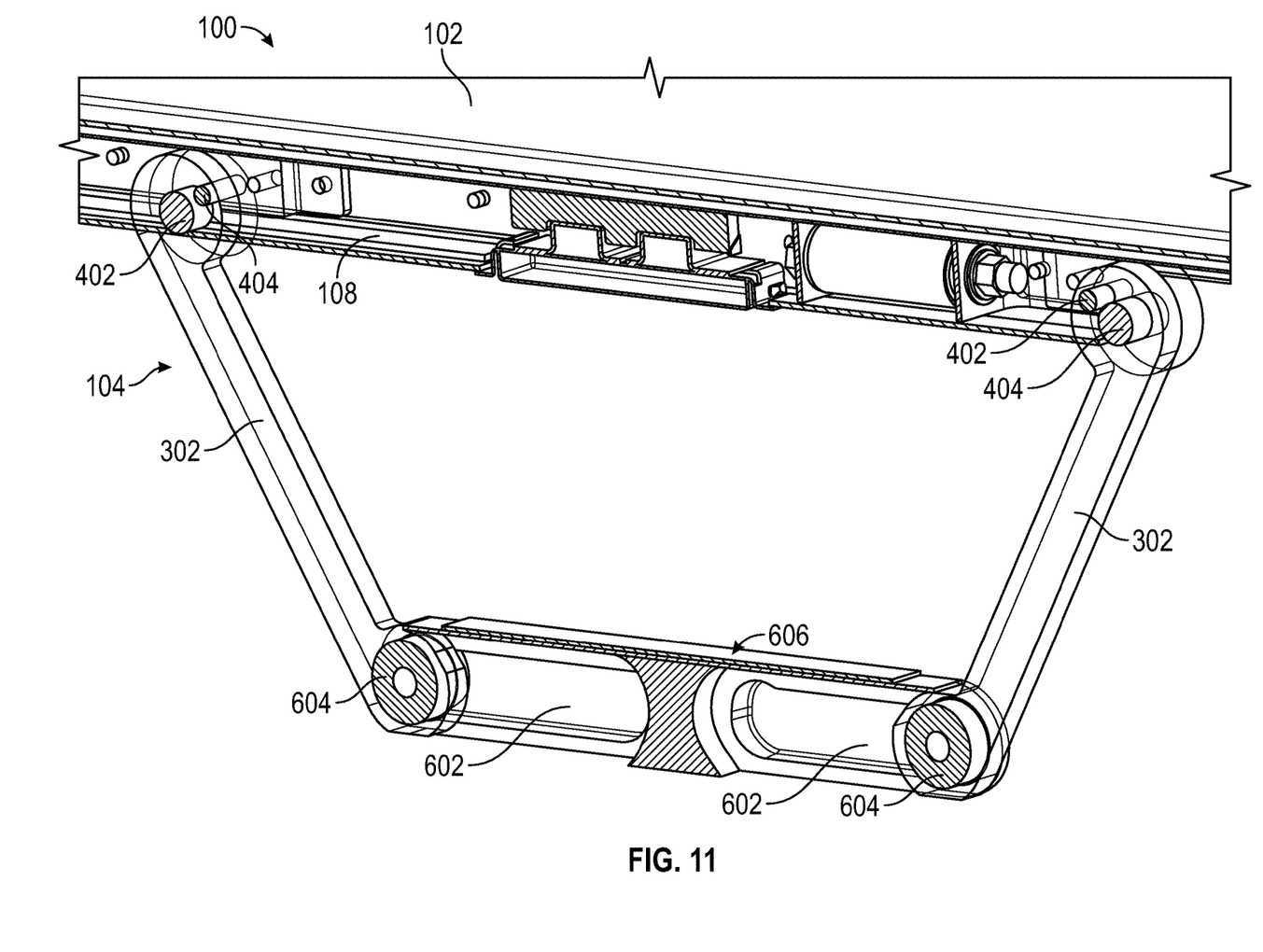
FIG. 11 is another sectional view of the attendant step assembly of FIG. 3.
Figure 12:
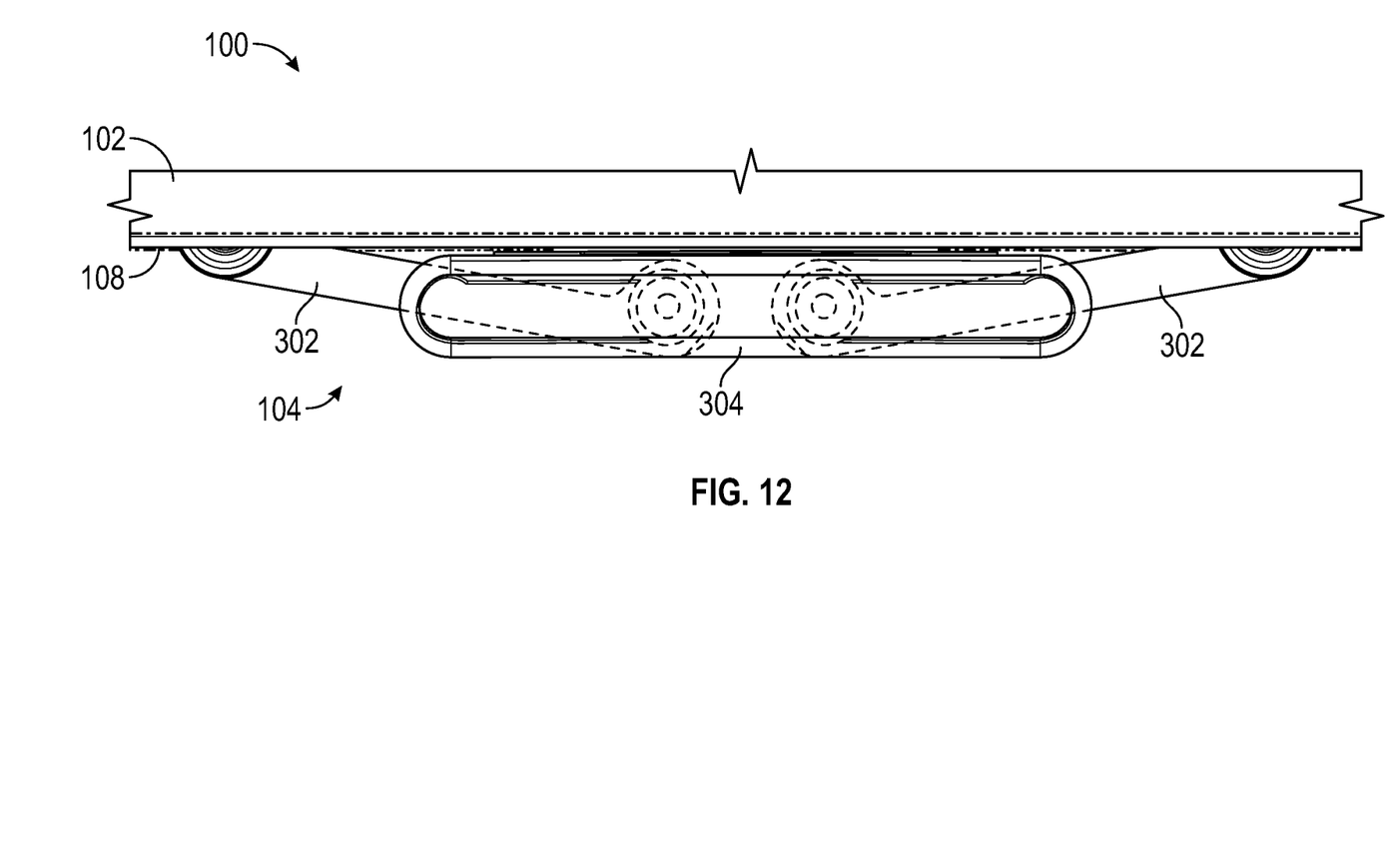
FIG. 12 is a side view of the attendant step assembly of FIG. 3 in the stowed position.

In certain embodiments, and as illustrated in FIGS. 9A-B, the armrest 102 is movable between a raised (or deployed) position (FIG. 9A) and a lowered (or stowed) position relative to a floor 902, which may be a cabin floor of an aircraft or other support surface as desired. In various embodiments, the movement between the raised position and the deployed position may optionally facilitate access to a passenger seat associated with the armrest 102. In certain embodiments, a distance between the floor 902 and the bottom side 108 of the armrest 102 in the raised position (FIG. 9A) is greater than a distance between the floor 902 and the bottom side 108 of the armrest 102 in the stowed position (FIG. 9B).

The attendant step assembly 104 is connected to the bottom side 108 of the armrest 102 and includes support legs 302 and a step 304. As illustrated, the support legs 302 support and connect the step 304 relative to the bottom side 108 of the armrest 102. In certain embodiments, and as illustrated in FIGS. 9A-B, the attendant step assembly 104 is connected to the bottom side 108 of the armrest 102 such that the step 304 is below the bottom side 108 of the armrest 102 in both the raised position and the lowered position. Stated differently, the step 304 may be outside of the armrest 102 in both the raised position and the lowered position. Such positioning may allow for an inner area or cavity of the armrest 102 to be utilized for other features or components, including but not limited to the including the pocket 202. In certain embodiments, and as discussed in detail below, the attendant step assembly 104 is adjustable between a stowed position (FIG. 9B) and a deployed position (FIG. 9A). In various embodiments, the attendant step assembly 104 is in the stowed position when the armrest is in the lowered position and the attendant step assembly 104 is in the deployed position when the armrest 102 is in the raised position. In certain embodiments, the armrest assembly 104 may optionally be biased towards the deployed position.

Referring to FIGS. 3-8, the attendant step assembly 104 is illustrated in detail. In certain embodiments, the components of the attendant step assembly 104 may be formed of materials including, but not limited to, aluminum, stainless steel, aramid fibers, polycarbonate, polypropylene, other metallic materials, composite materials, other similar materials, combinations thereof, or other materials as desired. In the embodiment illustrated, the support legs 302 and step 304 are constructed from metal.

Figure 4:
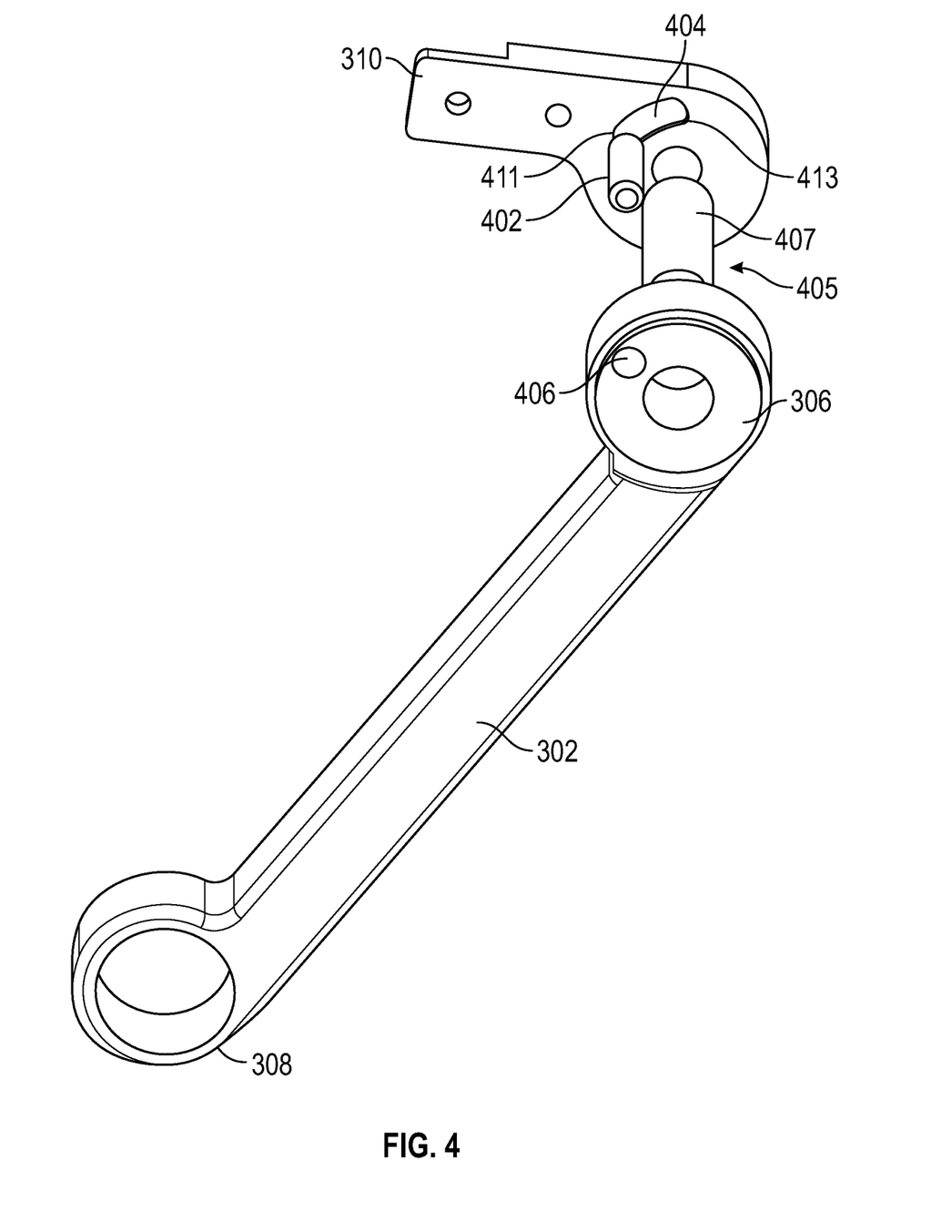
FIG. 4 is an exploded view of a support leg of the attendant step assembly of FIG. 3.
Figure 5:
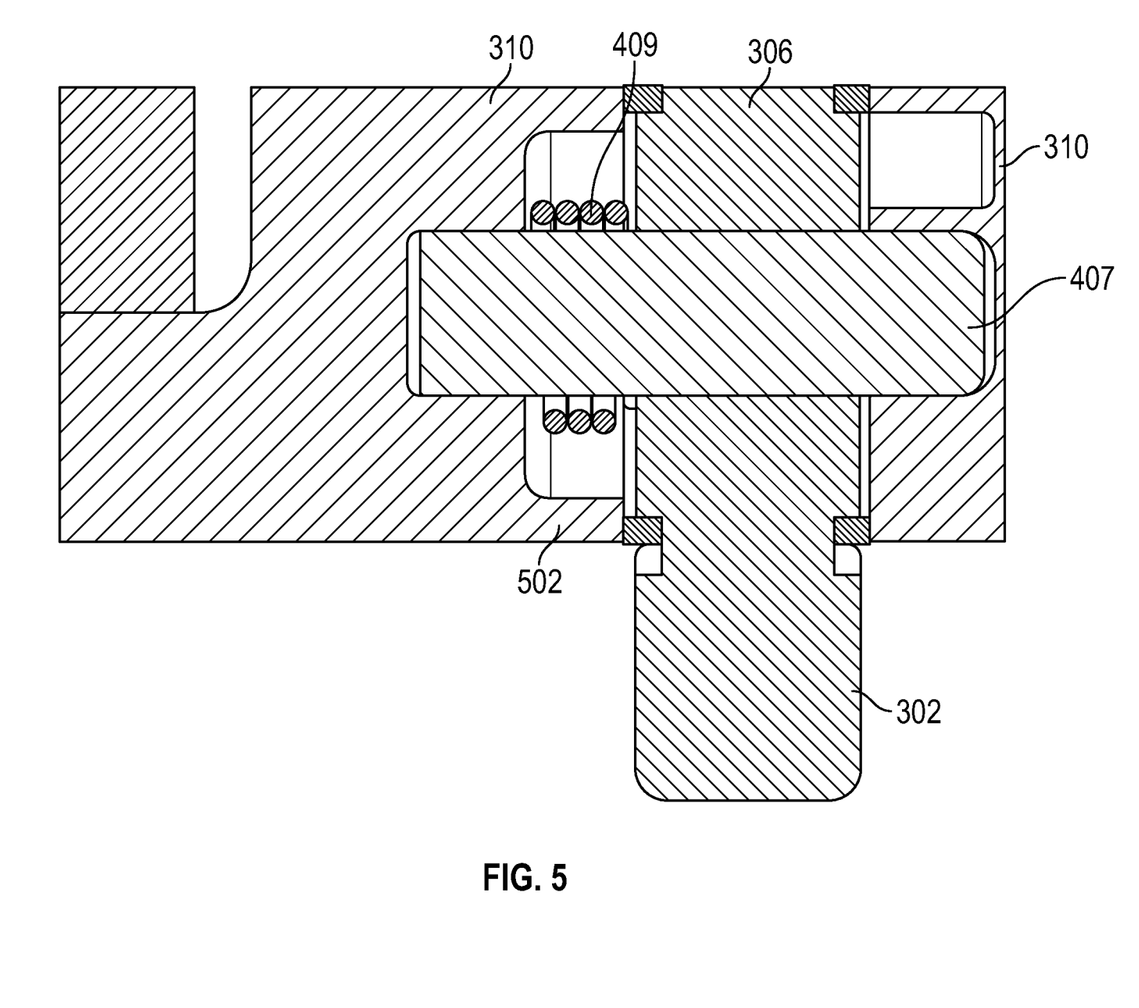
FIG. 5 is a sectional view of the support leg of the attendant step assembly of FIG. 3 taken along line 5-5 in FIG. 3.

As best illustrated in FIG. 4, each support leg 302 of the attendant step assembly 104 includes a first end 306 and a second end 308 opposite the first end 306. The first end 306 is connected to the bottom side 108 of the armrest 102, and the second end 308 is connected to the step 304. In some embodiments, the first end 306 of each support leg 302 may be connected to the bottom side 108 of the armrest 102 using one or more brackets 310. While two brackets 310 are illustrated, any number of brackets 310 and/or other support structures may be utilized as desired to connect the support legs 302 to the armrest 102. In certain embodiments, and as best illustrated in FIGS. 4 and 5, movement mechanisms 405 are provided such that the first end 306 is pivotably connected to the brackets 310 and thus is pivotable relative to the armrest 102. In the embodiment illustrated, the movement mechanism 405 includes a pin 407 and a biasing member 409, including but not limited to a torsion spring. Optionally, the biasing member 409 may bias the attendant step assembly 104 towards the deployed position. As best illustrated in FIG. 5, the first end 306 of each support leg 302 may be supported on the pin 407 such that the support leg 302 is rotatable about the pin.

Optionally, and as best illustrated in FIG. 4, a stopper pin 402 and a stopper slot 404 may be provided to limit rotation of the support leg 302 relative to the brackets 310 and thus relative to the armrest 102. In the embodiment illustrated in FIG. 4, the stopper pin 402 is received within an aperture 406 in the first end 306 of the support leg 302 such that the stopper pin 402 is fixed relative to the support leg 302, and the stopper slot 404 is provided in one or more of the brackets 310. In other embodiments, the stopper pin 402 may be monolithically or integrally formed with the support leg 302. Moreover, in other embodiments, the stopper pin 402 may be provided on the bracket(s) 310 and/or fixed relative to the bracket(s) 310, and the stopper slot 404 is provided on the support leg 302.

The stopper pin 402 is at least partially received in the stopper slot 404 and is movable within the stopper slot 404 (or vice versa) such that the stopper pin 402 can selectively engage a first end 411 or a second end 413 of the stopper slot 404 depending on rotation of the support leg 302. In certain embodiments, the stopper pin 402 engages the first end 411 of the stopper slot 404 when the attendant step assembly 104 is in the deployed position and engages the second end 413 of the stopper slot 404 when the attendant step assembly 104 is in the stowed position. In some embodiments, the orientation and configuration of the first end 411 and the second end 413 may define a maximum angle and a minimum angle of the support leg 302 relative to the bottom side 108 of the armrest 102. In one non-limiting example, the support leg 302 in the stowed position (e.g., where the stopper pin 402 engages the second end 413 of the stopper slot 404), the support leg 302 may extend at an angle of 10° relative to the bottom side 108, and in the deployed position (e.g., where the stopper pin 402 engages the first end 411 of the stopper slot 404), the support leg 302 may extend at an angle of 60° relative to the bottom side 108. In other embodiments, the support leg 302 may be adjusted to extend at other angles as desired in either the deployed position or the stowed position, and the support leg 302 may further be adjusted such that a length of the stopper slot 404 (and thus the range of motion of the support leg 302) is adjusted to any range of angles as desired relative to the bottom side 108. While a stopper pin and stopper slot are illustrated as movement limiters, in other embodiments, or devices or components may be utilized to control movement of the support legs 302 relative to the armrest 102.

The second end 308 of each support leg 302 is connected to the step 304. In certain embodiments, the second end 308 of each support leg 302 is pivotably connected to the step 304 such that an angle of the support legs 302 relative to the step 304 is adjustable. In various embodiments, the first end 306 of each support leg 302 pivotably connected to the armrest 102 and the second end 308 of each support leg 302 pivotably connected to the step 304 may allow for the attendant step assembly 104 to be movable between the stowed position and the deployed position. The second end 308 may be pivotably connected to the step 304 using various suitable devices or mechanisms as desired.

Figure 3:
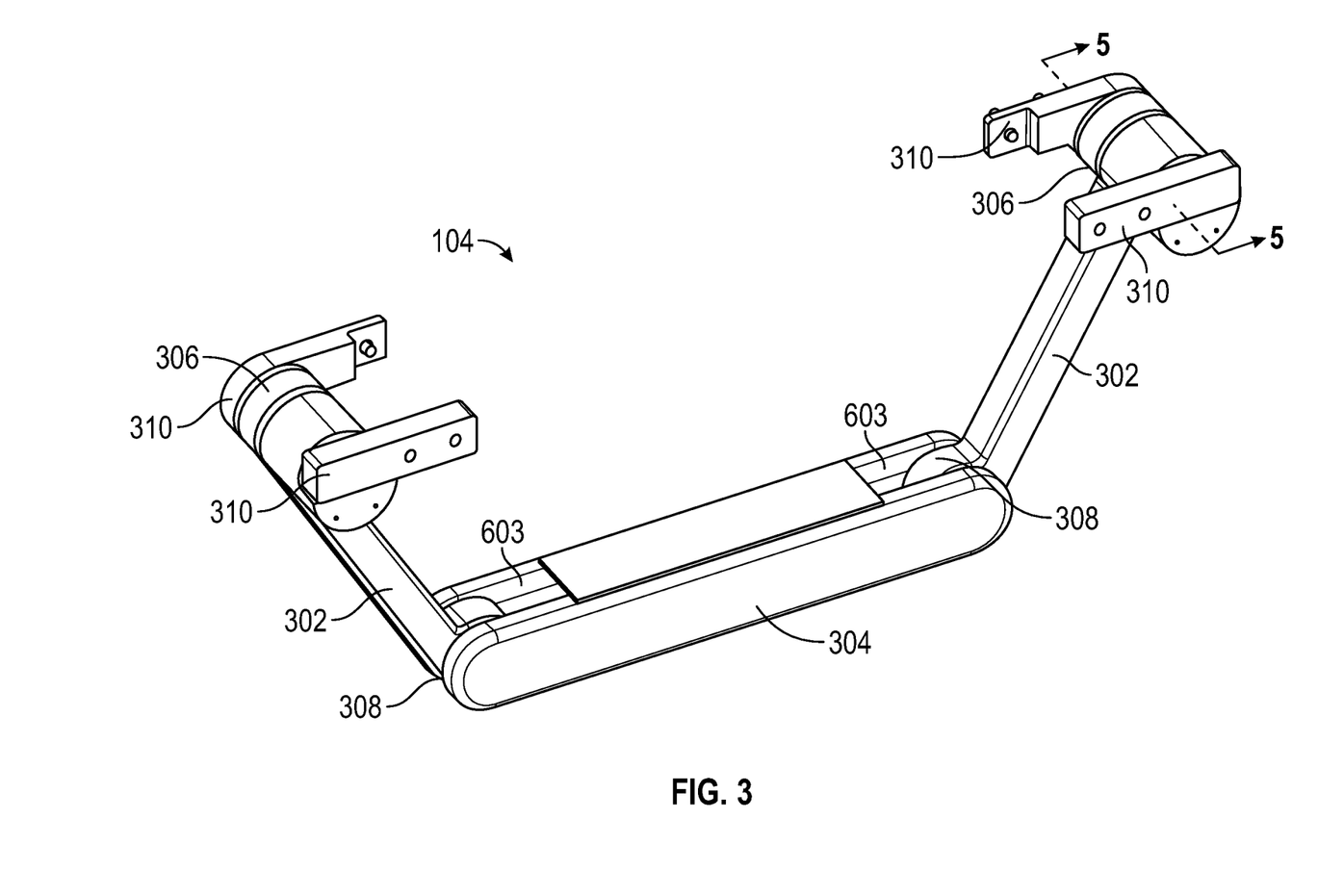
FIG. 3 is a perspective view of an attendant step assembly of the armrest assembly of FIG. 1.

In some embodiments, in addition to being pivotably connected to the step 304, the second end 308 of each support leg 302 may also be linearly movable relative to the step 304. In these embodiments, the support legs 302 and/or the step 304 may include various devices or mechanisms such that the second ends 308 are linearly movable and pivotable relative to the step 304. As best illustrated in FIGS. 6-8, and 11, in the present embodiment, the support legs 302 include rollers 604, and the step 304 includes guide channels 602 that receive the respective rollers 604. The number of guide channels 602 illustrated should not be considered limiting on the disclosure. Optionally, and as illustrated in FIG. 3, the step 304 may include openings 603 that may facilitate linear movement of the support legs 302 relative to the step 304.

Figure 6:
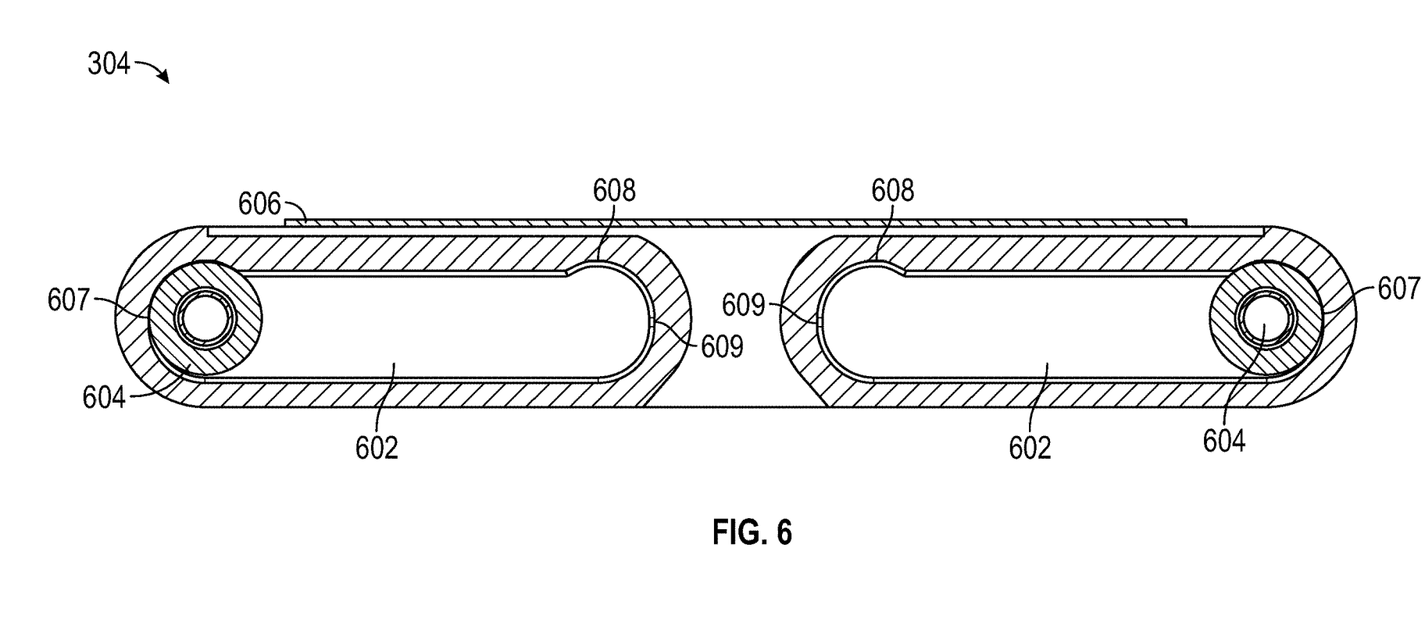
FIG. 6 is a side view of the step of the attendant step assembly of FIG. 3.
Figure 7:
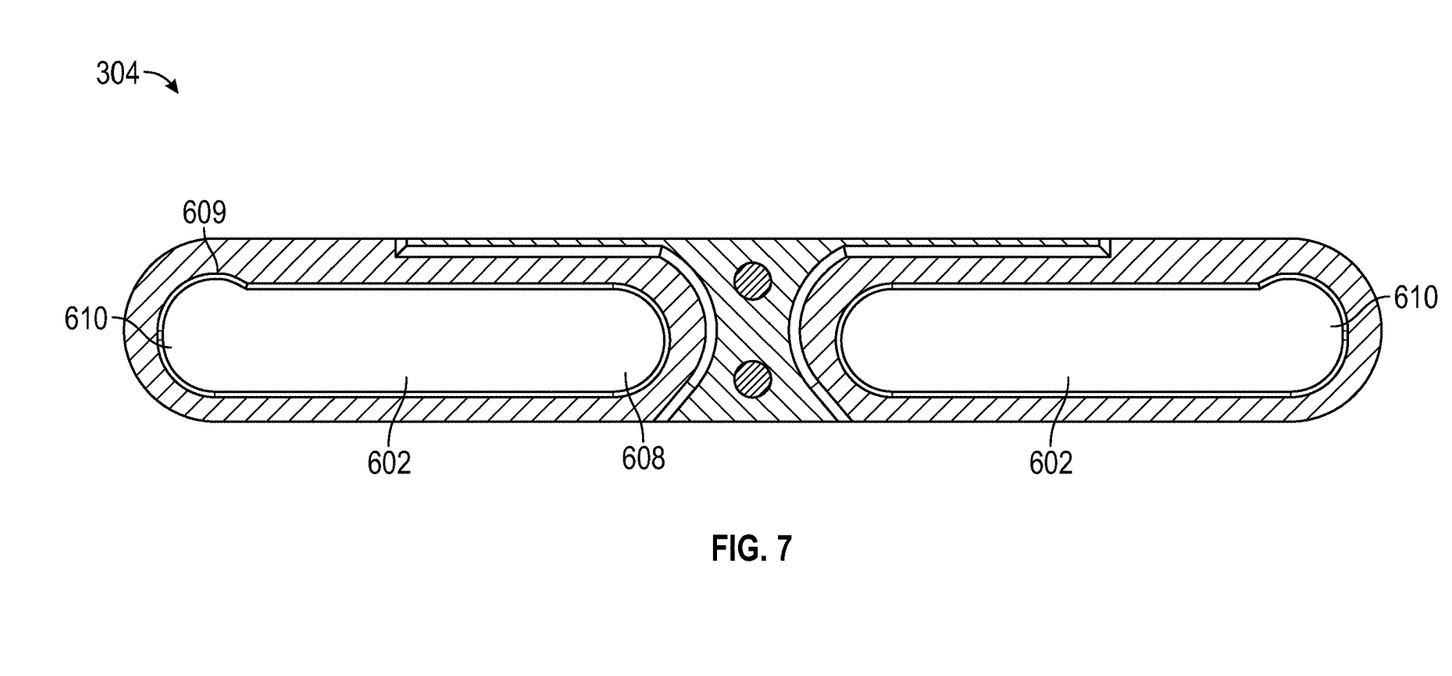
FIG. 7 is another side view of the step of the attendant step assembly of FIG. 3.
Figure 8:
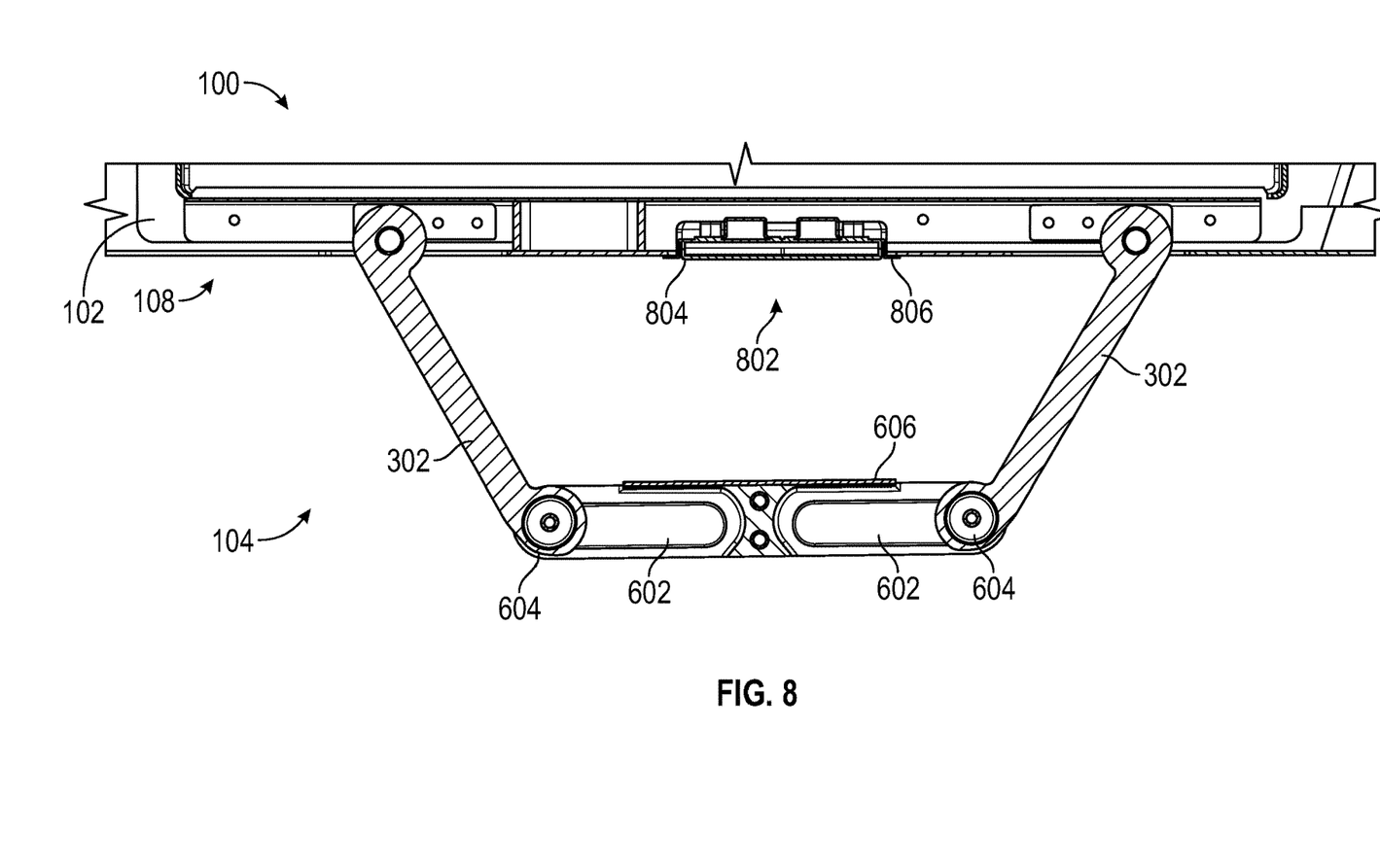
FIG. 8 is a sectional view of the attendant step assembly of FIG. 3.

As best illustrated in FIGS. 6-8, each guide channel 602 includes a first end 607 and a second end 609. In some embodiments, the guide channels 602 may extend substantially horizontally, although in other embodiments the guide channels 602 may extend in various directions as desired and/or may have various shapes or sizes as desired. In certain embodiments, the roller 604 (and/or second end 308) of a particular support leg 302 may engage the first end 607 when the attendant step assembly 104 is in the deployed position and may engage the second end 609 when the attendant step assembly 104 is in the stowed position. Optionally, and as best illustrated in FIGS. 6 and 7, one or both of the ends 607, 609 may include a stabilizing pocket 608. In the embodiment illustrated, the first ends 607 are illustrated as having stabilizing pockets 608 while the second ends 609 do not; however, in other embodiments, the second ends 609 may include stabilizing pockets 608. When included, the stabilizing pockets 608 may facilitate temporary positioning of the support legs 302 in the stowed position or the deployed position. In other words, some minimal force may optionally be required to move the rollers 604 from the stabilizing pockets 608.

In some embodiments, the step 304 may optionally include a gripping feature 606 on a top side of the step 304 and may provide grip for a user engaging the step 304. In the present embodiment, the gripping feature 606 is anti-slip tape, although other suitable gripping features may be utilized as desired.

As mentioned, the attendant step assembly 104 is movable between a stowed position and a deployed position. In various embodiments, the attendant step assembly 104 is biased towards the deployed position. In certain embodiments, attendant step assembly 104 may be in the deployed position while the armrest is in the raised position as illustrated in FIG. 9A. In some aspects, as the armrest 102 is moved from the lowered position to the raised position, the attendant step assembly 104 may automatically move from the stowed position to the deployed position (e.g., because it is biased towards the deployed position). In various embodiments, the attendant step assembly 104 is in the stowed position when the armrest 102 is in the lowered position. In certain aspects, moving the armrest 102 from the raised position to the lowered position may automatically move the attendant step assembly 104 from the deployed position to the stowed position.

In the deployed position, the attendant step assembly 104 may be utilized by a person as a step, for example to reach an overhead compartment or other location as desired. In these embodiments, the user may step on the step 304, and the gripping feature 606 may improve the engagement between the user's foot and the step 304. In the stowed position, the attendant step assembly 104 may have a minimized or reduced profile, even though the attendant step assembly 104 is not housed within the armrest 102. In certain examples, the rotational and linear movement of the support legs 302 relative to the step 304 may allow for the attendant step assembly 104 to have the reduced profile in the stowed position. In some optional examples, the reduced profile of the stowed attendant step assembly 104 may have a height of less than or equal to 3 inches, such as less than or equal to 2 inches, such as less than or equal to 1 inch. In other embodiments, the stowed attendant step assembly 104 may have other heights as desired.

The attendant step assembly 104 may have reduced manufacturing costs, reduced manufacturing waste, and/or improved optimization for loads that a fixed step assembly may experience.

In the following, further examples are described to facilitate the understanding of the invention:

Example 1. An armrest assembly for a passenger seat, the armrest assembly comprising: an armrest comprising a top side and a bottom side; and an attendant step assembly connected to the bottom side of the armrest, wherein the attendant step assembly comprises a step that is movable between a stowed position and a deployed position relative to the bottom side of the armrest.

Example 2. The armrest assembly of any of the preceding or subsequent examples, wherein the attendant step assembly further comprises a first support leg and a second support leg, wherein the first support leg and the second support leg are each connected to the step and pivotably connected to the bottom side of the armrest such that the step is movable between the stowed position and the deployed position.

Example 3. The armrest assembly of any of the preceding or subsequent examples, wherein the first support leg and the second support leg are each pivotable and slidable relative to the step.

Example 4. The armrest assembly of any of the preceding or subsequent examples, wherein, in the stowed position, the first support leg extends at a 10° angle relative to the bottom side of the armrest, and wherein, in the deployed position, the first support leg extends at a 60° angle relative to the bottom side of the armrest.

Example 5. The armrest assembly of any of the preceding or subsequent examples, wherein, in the stowed position and in the deployed position, the step is vertically below the bottom side of the armrest.

Example 6. The armrest assembly of any of the preceding or subsequent examples, wherein, in the stowed position, the step is a first distance below the bottom side of the armrest, and wherein, in the deployed position, the step is a second distance below the bottom side of the armrest that is greater than the first distance.

Example 7. The armrest assembly of any of the preceding or subsequent examples, wherein the armrest assembly is vertically movable between a lowered position and a raised position, and wherein, in the lowered position, the step is in the stowed position.

Example 8. The armrest assembly of any of the preceding or subsequent examples, wherein the attendant step assembly further comprises at least one support connecting the step to the bottom side of the armrest, wherein the at least one support comprises a first end and a second end opposite from the first end, and wherein the first end is pivotably connected to the bottom side of the armrest.

Example 9. The armrest assembly of any of the preceding or subsequent examples, wherein the second end is at least one of pivotable relative to the step or slidable relative to the step.

Example 10. The armrest assembly of any of the preceding or subsequent examples, wherein the step defines at least one guide channel, and wherein the second end of the at least one support is at least partially received within the at least one guide channel and is linearly movable along the at least one guide channel.

Example 11. The armrest assembly of any of the preceding or subsequent examples, wherein the at least one guide channel is elongated and comprises a first end and a second end opposite from the first end, wherein the first end comprises a first stabilizing pocket and the second end comprises a second stabilizing pocket.

Example 12. The armrest assembly of any of the preceding or subsequent examples, wherein, in the stowed position, the second end of the at least one support engages the second stabilizing pocket of the at least one guide channel, and wherein, in the deployed position, the second end of the at least one support engages the first stabilizing pocket of the at least one guide channel.

Example 13. The armrest assembly of any of the preceding or subsequent examples, wherein the first end of the support comprises a stopper slot, wherein the armrest assembly further comprises a stopper pin retained within the stopper slot, wherein the stopper pin is fixed relative to the at least one support.

Example 14. The armrest assembly of any of the preceding or subsequent examples, wherein the stopper pin engages a first end of the stopper slot when the step is in the stowed position and engages a second end of the stopper slot when the step is in the deployed position.

Example 15. The armrest assembly of any of the preceding or subsequent examples, wherein the step is biased towards the deployed position.

Example 16. An attendant step assembly for a passenger seat, the attendant step assembly comprising: a first support comprising a first end and a second end; a second support comprising a first end and a second end; and a step comprising a first guide channel within the step, a second guide channel within the step, and a step surface, wherein the second end of the first support is at least partially received within the first guide channel such that the second end of the first support is pivotable and linearly movable relative to the step, wherein the second end of the second support is at least partially received within the second guide channel such that the second end of the second support is pivotable and linearly movable relative to the step, and wherein the first end of the first support and the first end of the second support are each connectable with an armrest of the passenger seat.

Example 17. The attendant step assembly of any of the preceding or subsequent examples, wherein the step is movable between a stowed position and a deployed position, wherein, in the stowed position, the second end of the first support engages an inner end of the first guide channel and the first support extends at a first angle relative to the step surface, and wherein, in the deployed position, the second end of the first support engages an outer end of the first guide channel and the first support extends at a second angle relative to the step surface that is greater than the first angle.

Example 18. An attendant step assembly for a passenger seat, the attendant step assembly comprising: a support comprising a first end and a second end, wherein the first end is connectable to an armrest of the passenger seat; and a step comprising a step surface, wherein the step is movably connected to the second end of the support such that the second end of the support is rotatable and slidable relative to the step surface.

Example 19. The attendant step assembly of any of the preceding or subsequent examples, wherein the step comprises a guide channel within the step and between the step surface and a bottom surface opposite from the step surface, and wherein the second end of the support is engaged with the step via the guide channel.

Example 20. An armrest assembly comprising an armrest and the attendant step assembly of any of the preceding examples.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An armrest assembly for a passenger seat, the armrest assembly comprising:
an armrest comprising a top side and a bottom side; and
an attendant step assembly connected to the bottom side of the armrest, wherein the attendant step assembly comprises a step that is movable between a stowed position and a deployed position relative to the bottom side of the armrest,
wherein the attendant step assembly further comprises a first support leg and a second support leg, wherein the first support leg and the second support leg are each connected to the step and pivotably connected to the bottom side of the armrest such that the step is movable between the stowed position and the deployed position, and
wherein the first support leg and the second support leg are each pivotable and slidable relative to the step.

2. The armrest assembly of claim 1, wherein, in the stowed position, the first support leg extends at a 10° angle relative to the bottom side of the armrest, and wherein, in the deployed position, the first support leg extends at a 60° angle relative to the bottom side of the armrest.

3. The armrest assembly of claim 1, wherein, in the stowed position and in the deployed position, the step is vertically below the bottom side of the armrest.

4. The armrest assembly of claim 1, wherein, in the stowed position, the step is a first distance below the bottom side of the armrest, and wherein, in the deployed position, the step is a second distance below the bottom side of the armrest that is greater than the first distance.

5. The armrest assembly of claim 1, wherein the armrest assembly is vertically movable between a lowered position and a raised position, and wherein, in the lowered position, the step is in the stowed position.

6. The armrest assembly of claim 1, wherein the attendant step assembly further comprises at least one support connecting the step to the bottom side of the armrest, wherein the at least one support comprises a first end and a second end opposite from the first end, and wherein the first end is pivotably connected to the bottom side of the armrest.

7. The armrest assembly of claim 6, wherein the second end is at least one of pivotable relative to the step or slidable relative to the step.

8. The armrest assembly of claim 6, wherein the step defines at least one guide channel, and wherein the second end of the at least one support is at least partially received within the at least one guide channel and is linearly movable along the at least one guide channel.

9. The armrest assembly of claim 8, wherein the at least one guide channel is elongated and comprises a first end and a second end opposite from the first end, wherein the first end comprises a first stabilizing pocket and the second end comprises a second stabilizing pocket.

10. The armrest assembly of claim 9, wherein, in the stowed position, the second end of the at least one support engages the second stabilizing pocket of the at least one guide channel, and wherein, in the deployed position, the second end of the at least one support engages the first stabilizing pocket of the at least one guide channel.

11. The armrest assembly of claim 6, wherein the first end of the support comprises a stopper slot, wherein the armrest assembly further comprises a stopper pin retained within the stopper slot, wherein the stopper pin is fixed relative to the at least one support.

12. The armrest assembly of claim 11, wherein the stopper pin engages a first end of the stopper slot when the step is in the stowed position and engages a second end of the stopper slot when the step is in the deployed position.

13. The armrest assembly of claim 1, wherein the step is biased towards the deployed position.

14. An armrest assembly for a passenger seat, the armrest assembly comprising:

an armrest; and an attendant step assembly comprising:

a first support comprising a first end and a second end;

a second support comprising a first end and a second end; and a step comprising a first guide channel within the step, a second guide channel within the step, and a step surface, wherein the second end of the first support is at least partially received within the first guide channel such that the second end of the first support is pivotable and linearly movable relative to the step, wherein the second end of the second support is at least partially received within the second guide channel such that the second end of the second support is pivotable and linearly movable relative to the step, and wherein the first end of the first support and the first end of the second support are each connectable with the armrest of the passenger seat.

15. The armrest assembly of claim 14, wherein the step is movable between a stowed position and a deployed position, wherein, in the stowed position, the second end of the first support engages an inner end of the first guide channel and the first support extends at a first angle relative to the step surface, and wherein, in the deployed position, the second end of the first support engages an outer end of the first guide channel and the first support extends at a second angle relative to the step surface that is greater than the first angle.

16. An armrest assembly for a passenger seat, the armrest assembly comprising:

an armrest; and an attendant step assembly for a passenger seat, the attendant step assembly comprising:

a support comprising a first end and a second end, wherein the first end is connectable to an armrest of the passenger seat; and a step comprising a step surface, wherein the step is movably connected to the second end of the support such that the second end of the support is rotatable and slidable relative to the step surface such that the step is vertically movable below the armrest.

17. The armrest assembly of claim 16, wherein the step comprises a guide channel within the step and between the step surface and a bottom surface opposite from the step surface, and wherein the second end of the support is engaged with the step via the guide channel.

* * * * *